(12) United States Patent
Goldsmith et al.

(10) Patent No.: US 9,344,162 B2
(45) Date of Patent: May 17, 2016

(54) EXPLOITING SPATIAL DEGREES OF FREEDOM IN MULTIPLE INPUT MULTIPLE OUTPUT (MIMO) RADIO SYSTEMS

(71) Applicants: Andrea Goldsmith, Menlo Park, CA (US); Yair Noam, Stanford, CA (US); Alexandros Manolakos, Stanford, CA (US); Konstantinos Dimou, Stanford, CA (US)

(72) Inventors: Andrea Goldsmith, Menlo Park, CA (US); Yair Noam, Stanford, CA (US); Alexandros Manolakos, Stanford, CA (US); Konstantinos Dimou, Stanford, CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 0 days.

(21) Appl. No.: 13/871,962

(22) Filed: Apr. 26, 2013

(65) Prior Publication Data

US 2014/0126666 A1    May 8, 2014

Related U.S. Application Data

(60) Provisional application No. 61/639,797, filed on Apr. 27, 2012, provisional application No. 61/755,427, filed on Jan. 22, 2013.

(51) Int. Cl.
*H04B 7/04* (2006.01)
*H04B 7/02* (2006.01)

(52) U.S. Cl.
CPC .............. *H04B 7/0413* (2013.01); *H04B 7/024* (2013.01)

(58) Field of Classification Search
CPC .................... H04B 7/0413; H04B 7/024

USPC ................. 375/259, 260, 316, 346, 295, 296
See application file for complete search history.

(56) References Cited

U.S. PATENT DOCUMENTS

| | | | |
|---|---|---|---|
| 7,616,695 B1 | 11/2009 | Sarrigeorgidis | |
| 8,705,443 B2* | 4/2014 | Tang et al. | 370/328 |
| 2006/0205357 A1* | 9/2006 | Kim | 455/69 |
| 2006/0251156 A1* | 11/2006 | Grant et al. | 375/148 |
| 2008/0049709 A1* | 2/2008 | Pan et al. | 370/344 |
| 2010/0273428 A1* | 10/2010 | Kimura et al. | 455/63.3 |
| 2010/0303182 A1 | 12/2010 | Daneshrad et al. | |

(Continued)

FOREIGN PATENT DOCUMENTS

RU    2388142 C2    4/2010

OTHER PUBLICATIONS

International Search Report dated Feb. 13, 2014 for PCT application No. PCT/US2013/038528.

(Continued)

*Primary Examiner* — Vineeta Panwalkar
(74) *Attorney, Agent, or Firm* — Mintz Levin Cohn Ferris Glovsky and Popeo, P.C.

(57) ABSTRACT

Methods and apparatuses, including computer program products, are provided for determining the null-space for a channel between a transmitter and an unintended receiver. In one aspect there is provided a method. The method may include transmitting, by a secondary transmitter, a plurality of learning signals, determining, for each of the plurality of learning signals, a value representative of an interference caused by the transmitting to an unintended receiver, determining, based on the determined values, a null-space for a channel between the secondary transmitter and the unintended receiver and transmitting, by the secondary transmitter, a signal in accordance with the determined null-space.

23 Claims, 9 Drawing Sheets

(56) References Cited

U.S. PATENT DOCUMENTS

2011/0294415 A1* 12/2011 Jeon et al. .................... 455/7
2012/0034874 A1   2/2012 Yiu et al.

OTHER PUBLICATIONS

A. Goldsmith, "Wireless communications". Cambridge University Press, 2005.
A. Goldsmith, S. Jafar, I. Marie, and S. Srinivasa, "Breaking spectrum gridlock with cognitive radios: An information theoretic perspective," *Proceedings of the IEEE*, vol. 97, pp. 894-914, May 2009.
A. Ruhe, "On the quadratic convergence of the jacobi method for normal matrices," BIT Numerical Mathematics, vol. 7, pp. 305-313, 1967. 10.1007/BF01939324.
A. Tulino and S. Verdu, "Random matrix theory and wireless communications", vol. 1. Now Publishers Inc, 2004.
Alexandros Manolakos, Yair Noam, Konstantinos Dimou, Andrea J. Goldsmith, "Blind Null-space Tracking for MIMO Underlay Cognitive Radio Networks", Submitted to IEEE Globecom 2012. Dec. 3-7, 2012.
Andrea J. Goldsmith, Syed Ali Jafar, Ivana Marie, Sudhir Srinivasa "Breaking Spectrum Gridlock with Cognitive Radios: An Information Theoretic Perspective", IEEE Transactions in Information Theory, 2008.
B. N. Parlett, "The Symmetric Eigenvalue Problem", vol. 20. Society for Industrial Mathematics, 1998.
C. Shin, R. Heath, and E. Powers, "Blind channel estimation for MIMO-OFDM systems," Vehicular Technology, IEEE Transactions on, vol. 56, pp. 670 -685, Mar. 2007.
G. E.Forsythe and P. Henrici, "The cyclic Jacobi method for computing the principal values of a complex matrix," *Transactions of the American Mathematical Society*, vol. 94, No. 1, pp. 1-23, 1960.
G. Folland, *"Real Analysis: Modern Techniques and their Applications"*. New York, NY: John Wiley & sons, 1984.
G. H. Golub and C. F. V. Loan, "Matrix Computations". Baltimore, MD: The Johns Hopkins University Press, 3 ed., 1996.
G. H. Golub and H. A. van der Vorst, "Eigenvalue computation in the 20th century," Journal of Computational and Applied Mathematics, vol. 123, No. 1-2, pp. 35-65, 2000. ice:titlel, Numerical Analysis 2000. vol. III: Linear Algebra.
G. Scutari and D. Palomar, "MIMO cognitive radio: A game theoretical approach," Signal Processing, IEEE Transactions on, vol. 58, pp. 761-780, Feb. 2010.
G. Scutari, D. Palomar, and S. Barbarossa, "Cognitive MIMO radio," *Signal Processing Magazine, IEEE*, vol. 25, pp. 46-59, Nov. 2008.
H. Yi, "Nullspace-based secondary joint transceiver scheme for cognitive radio MIMO networks using second-order statistics," in Communications (ICC), 2010 IEEE International Conference on, pp. 1-5, May 2010.
J.H. Wilkinson, "Note on the quadratic convergence of the Cyclic Jacobi process," Numerische Mathematik, vol. 4, pp. 296-300, 1962. 10.1007/BF01386321.
K. V. Fernando, "Linear convergence of the row cyclic Jacobi and Kogbetliantz methods," Numerische Mathematik, vol. 56, pp. 73-91, 1989.
K.Athreya and S. Lahiri, "Measure theory and probability theory". Springer-Verlag New York Inc, 2006.
L. Zhang, Y.-C. Liang, Y. Xin, and H. V. Poor, "Robust cognitive beamforming with partial channel state information," *Wireless Communication, IEEE Transactions on*, vol. 8, pp. 4143-4153, Aug. 2009.
P. Henrici and K. Zimmermann, "An estimate for the norms of certain cyclic Jacobi operators," Linear Algebra and Its Applications, vol. 1, No. 4, pp. 489-501, 1968.
P. Henrici, "On the speed of convergence of Cyclic and Quasicyclic Jacobi methods for computing eigenvalues of Hermitian matrices," *Journal of the Society for Industrial and Applied Mathematics*, vol. 6, No. 2, pp. pp. 144-162, 1958.
R. A. Horn and C. R. Johnson, "Matrix Analysis". Cambridge, NY: Cambridge University Press, 1987.
R. P. Brent and F. T. Luk, "The solution of Singular-Value and Symmetric Eigenvalue Problems on multiprocessor arrays," vol. 6, No. 1, pp. 69-84, 1985.
R. Zhang and Y.-C. Liang, "Exploiting multi-antennas for opportunistic spectrum sharing in cognitive radio networks," *Selected Topics in Signal Processing, IEEE Journal of* vol. 2, pp. 88-102, Feb. 2008.
S. Haykin, "Cognitive radio: brain-empowered wireless communications," IEEE Journal on Selected Areas in Communications, vol. 23, No. 2, pp. 201-220, Feb. 2005.
S. Huang, X. Liu, and Z. Ding, "Decentralized cognitive radio control based on inference from primary link control information," *Selected Areas in Communications, IEEE Journal on*, vol. 29, pp. 394-406, Feb. 2011.
S. Zhou, B. Muquet, and G. Giannakis, "Subspace-based (semi-) blind channel estimation for block precoded space-time OFDM," *Signal Processing, IEEE Transactions on*, vol. 50, pp. 1215-1228, May 2002.
Thomas M. Cover, "Enumerative Source Encoding", IEEE Transactions on Information Theory, IT-19(1):73-77, Jan. 1973.
V.Hari, "On sharp quadratic convergence bounds for the serial Jacobi methods," Numerische Mathematik, vol. 60, pp. 375-406, 1991.
Wireless Open-Access Research Platform. <<<http://warp.rice.edu/index.php>>>. Downloaded Dec. 14, 2015.
Y. J. Zhang and A. M.-C. So, "Optimal spectrum sharing in MIMO cognitive radio networks via semidefnite programming," *Selected Areas in Communications, IEEE Journal on*, vol. 29, pp. 362-373, Feb. 2011.
Y. Noam and A. J. Goldsmith, "Exploiting spatial degrees of freedom in MIMO cognitive radio systems." Submitted to Communications (ICC), 2012 IEEE International Conference on Communications, Jun. 10-15, 2012.
Yair Noam, Andrea J. Goldsmith, "Blind Null-Space Learning for Spatial Coexistence in MIMO Cognitive Radios,". Fellow, IEEE. Feb. 2, 2012. IEEE ICC, Jun. 10-15, 2012.
Yair Noam, Andrea J. Goldsmith, "Spatial MAC in MIMO Communications and its Application to Underlay Cognitive Radio" Department fo Electrical Engineering; Stanford University. Feb. 2, 2012.
Z. Chen, C.-X. Wang, X. Hong, J. S. Thompson, S. A. Vorobyov, F. Zhao, H. Xiao, and X. Ge, "Interference mitigation for cognitive radio MIMO systems based on practical precoding," *Arxiv preprint* arXiv:1104.4155, vol. abs/1104.4155, Apr. 21, 2011.
Z. Ding and L. Qiu, "Blind MIMO channel identification from second order statistics using rank deficient channel convolution matrix," *Signal Processing, IEEE Transactions on*, vol. 51, pp. 535-544, Feb. 2003.

* cited by examiner

EXPLOITING SPATIAL DEGREES OF FREEDOM IN MULTIPLE INPUT MULTIPLE OUTPUT (MIMO) RADIO SYSTEMS

CROSS-REFERENCE TO RELATED APPLICATIONS

This application claims the benefit of U.S. Provisional Patent Application Ser. No. 61/639,797, filed on Apr. 27, 2012, and entitled "Exploiting Spatial Degrees of Freedom in Multiple Input Multiple Output (MIMO) Cognitive Radio Systems," and U.S. Provisional Patent Application Ser. No. 61/755,427, filed on Jan. 22, 2013, and entitled "Exploiting Spatial Degrees Of Freedom In Multiple Input Multiple Output (MIMO) Cognitive Radio Systems," both of which are incorporated by reference herein in their entirety.

STATEMENT OF GOVERNMENT SPONSORED SUPPORT

This invention was made with Government support under contract FA 9550-08-1-0480 awarded by the Air Force Office Of Scientific Research, under contract HDTRA 1-08-1-0010 awarded by the Defense Threat Reduction Agency, and under contract N 00014-09-1-0072 awarded by the Offfice of Naval Research. The Government has certain rights in this invention.

FIELD

The subject matter described herein relates to wireless communications processing.

BACKGROUND

Multiple-input multiple-output (MIMO) wireless communication systems utilize multiple transmit antennas and multiple receive antennas instead of a single antenna. MIMO systems often have multiple transmitters (e.g., one associated with each transmit antenna) and multiple receivers (e.g., one associated with each receive antenna). Some MIMO systems include multiple transmission systems, where each transmission system includes multiple transmitters and antennas. Multiple transmission systems may interfere with one another reducing the spectral efficiency, reducing receiver sensitivity, and reducing the total throughput of the MIMO transmission systems.

SUMMARY

Methods and apparatus, including computer program products, are provided for determining the null-space for a channel between a transmitter and an unintended receiver. In some example embodiments, there may be provided a method including transmitting, by a secondary transmitter, a plurality of learning signals, determining, for each of the plurality of learning signals, a value representative of an interference caused by the transmitting to an unintended receiver, determining, based on the determined values, a null-space for a channel between the secondary transmitter and the unintended receiver and transmitting, by the secondary transmitter, a signal in accordance with the determined null-space.

In some variations of some of the embodiments disclosed herein, one or more of the features disclosed herein including following may be included. The null-space may represent a configuration of the secondary transmitter that causes interference at the unintended receiver to be below a threshold interference value. The plurality of learning signals may be generated by at least applying rotation matrices to an initial multiple-input multiple-output precoding matrix. The rotation matrices may be determined by performing a cyclic Jacobi. The transmitted signal may be in accordance with the determined null-space to mitigate interference to the unintended receiver. The values representative of the interference may be received from the unintended receiver or a primary transmitter via at least one of a beacon or a control channel. The values may represent signal-to-noise plus interference ratio values. The values may be based on one or more observations of a response from the primary transmitter to each of the plurality of learning signals. The determining a null-space of the interference channel between the secondary transmitter and the unintended receiver may not depend on the modulation or coding of a signal transmitted by a primary transmitter or the plurality of learning signals transmitted by the secondary transmitter.

Like labels are used to refer to same or similar items in the drawings.

DETAILED DESCRIPTION

The subject matter disclosed herein relates to processes as well as related methods and apparatuses for learning a null-space of an interference channel between a secondary transmitter and a primary receiver, so that the secondary transmitter can coexist with the primary receiver. The primary receiver may be included in a multiple input, multiple output (MIMO) primary user (PU) system, and the secondary transmitter may be included in a MIMO secondary user (SU) system. In some exemplary embodiments, the phrase "primary user" refers to a radio system which has priority in accessing the electromagnetic spectrum, and the phrase "secondary user" refers to a user allowed to access the spectrum if it does not interfere with the PU. In some exemplary embodiments, the PU has priority equal to the SU. By learning the null-space of an interference channel between the SU transmitter and the PU receiver, the secondary user may utilize idle degrees of freedom that otherwise would be unused by the PU system. The process of learning the null-space may be implemented without any handshake, or explicit information exchange, between the PU and the SU. For example, the SU may learn the channel characteristics by iteratively varying the transmitted signal and then measuring the effect of the variation on the PU's signal to interference plus noise ratio (SINR) by listening to the signal transmitted by the PU or to its control channel. This learning may be enhanced by having the PU broadcast a periodic beacon which is a function of the interference level at the primary receiver, e.g., the primary user's noise plus interference power. Moreover, the periodic beacon may be transmitted through a low rate control channel. The learning process may be based on energy measurements, which may be independent of the transmission schemes of both the primary user and the secondary user (e.g., independent of their modulation, coding, and the like). The learning processes may also provide spatial division multiple access mechanisms for so-called "equal-priority" MIMO users sharing a common channel. In this case, the active user occupies some of the spatial degrees of freedom of the channel, and the incoming user uses the null-space learning algorithm to determine which degrees of freedom in the channel are not occupied such that the two users can co-exist with minimal interference between them.

Figure 1:
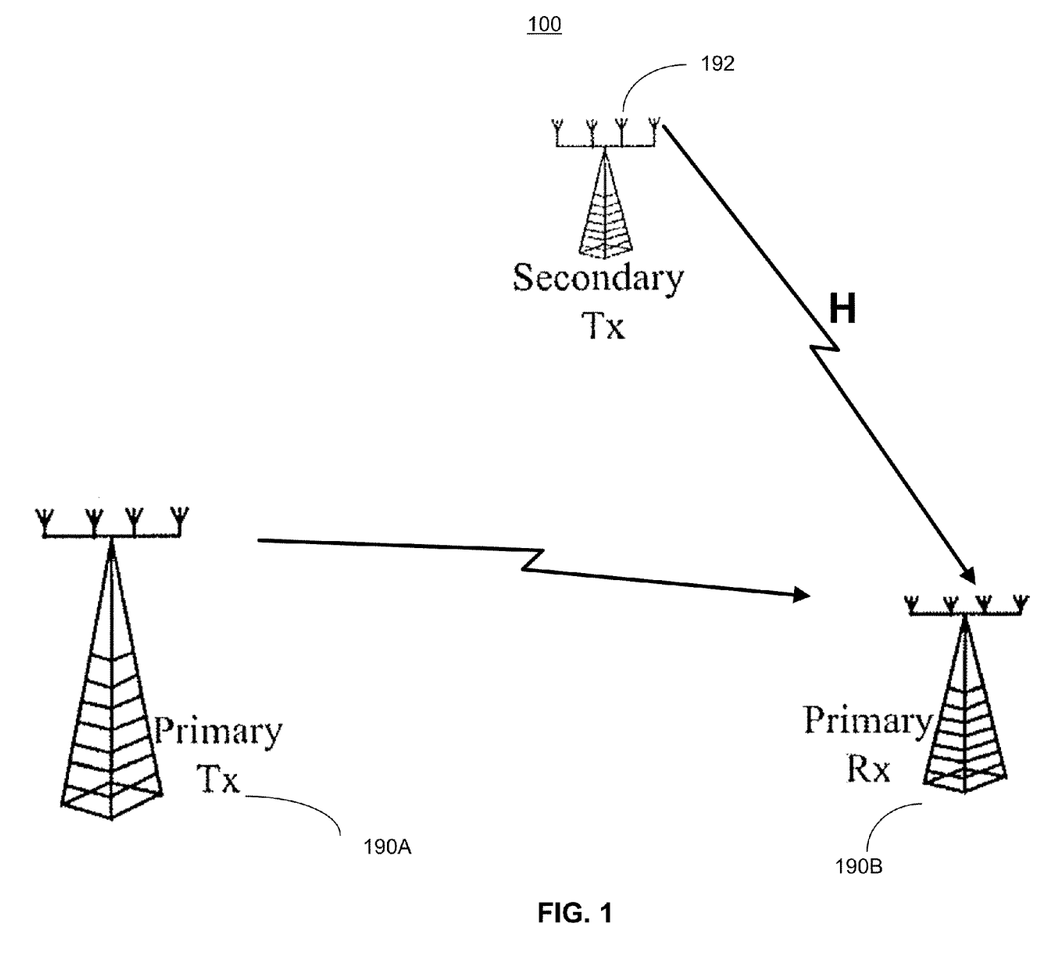
FIG. 1 depicts an example of a MIMO system in accordance with some implementations.

FIG. 1 depicts an example of a system 100 including a primary user transmitter 190A, a primary user receiver 190B, and a secondary user transmitter 192. In the example of FIG. 1, primary transmitter 190A transmits a MIMO signal and primary receiver 190B is an intended receiver of the signal from transmitter 190A. Secondary transmitter 192 also transmits a MIMO signal. In some implementations, secondary transmitter 192 includes a controller that determines the interference caused to the primary receiver 190A by the transmissions of the secondary transmitter 192 that adjusts the transmissions from the secondary transmitter 192 to minimize the interference caused by the secondary transmitter 192 to the primary receiver 190B.

At 190A, a primary transmitter 190A transmits a MIMO signal to primary receiver 190B. Primary transmitter 190A may be implemented as a radio such as a user equipment or base station in accordance with a cellular network such as 2G, 3G, 4G, LTE, GSM, or other cellular network, or as a wireless access point of a wireless network in accordance with a wireless local area network. Primary transmitter 190A may be configured to allow the communications to be adapted between primary transmitter 190A and primary receiver 190B. For example, primary receiver 190B may determine information representative of the signal quality received at primary receiver 190B. The primary receiver 190B may provide the information via a control channel or beacon to primary transmitter 190A. If the information received at the primary transmitter (via the beacon or control channel) indicates that the signal quality received at primary receiver 190B is below a threshold value, primary transmitter 190A may increase the transmit power and/or change the modulation of the transmitted signal and/or reduce the data rate of the transmitted signal to improve the signal quality. Transmitter 190A may adjust other features of the transmitted signal as well.

At 190B, a primary user receiver 190B receives the MIMO signal from primary transmitter 190A. The signal from primary transmitter 190A is directed via the antennas of primary transmitter 190A to primary receiver 190B. Primary receiver 190B may be implemented as a radio, such as a user equipment, or a cellular base station, or a wireless access point of a wireless local area network. Primary receiver 190B may receive a MIMO signal as well as any type of analog or digital modulation. Primary receiver 190B may include features that allow the communications to be adapted between primary transmitter 190A and primary receiver 190B. For example, a control channel between the primary transmitter 190A and primary receiver 190B may provide information from receiver 190B to transmitter 190A about the signal quality. If the signal quality falls below an acceptable level, receiver 190B may initiate an increase in the transmit power from primary transmitter 190A.

Primary receiver 190B may provide information about the received signal quality to transmitter 190A through a control channel or a beacon. In some implementations, the control channel may be another radio link facilitating sending signal quality information from receiver 190B to transmitter 190A. In other implementations, the control channel includes sending signal quality information from receiver 190B to transmitter 190A via a wired or other wireless connection, through the internet, or through a combination of wired and wireless connections.

At 192, a secondary transmitter 192 transmits a MIMO signal. Like primary transmitter 190A, secondary transmitter 192 may be implemented in a manner similar to primary transmitter 190A. Primary transmitter 190A can be the same type or a different type of transmitter. For example, both transmitters can be base stations of a cellular network or wireless access points. In another example, one transmitter can be cellular base station and the other transmitter can be a wireless access point. The primary transmitter 190A and secondary transmitter 192 can also be any other types of transmitters.

Secondary transmitter 192 may be configured to adjust the transmissions from secondary transmitter 192 to reduce the interference caused at the primary receiver 190B from the signal transmitted by secondary transmitter 192. Because the primary receiver 190B is not intended to receive the signal from secondary transmitter 192, the primary receiver 190B is sometimes referred to as an unintended receiver of the signal from secondary transmitter 192. As the transmissions from secondary transmitter 192 are adjusted, the interference caused to primary receiver 190B changes according to the adjustment. As such, the degradation to the signal intended to be received at primary receiver 190B (transmitted from primary transmitter 190A) changes according to the adjustments made to the signal transmitted from secondary transmitter 192. The adjustments are made to facilitate learning, by the secondary transmitter 192, the transmitted signal characteristics (e.g. spatial characteristics) that minimize the interference caused to primary transmitter 190B.

Secondary transmitter 192 may receive information from primary receiver 190B about the quality of the signal received from primary transmitter 190A via a beacon, a control channel, or the like. For example, primary receiver 190B may broadcast a beacon containing the signal to interference plus noise ratio (SINR) of the signal received at primary receiver 190B. Secondary transmitter 192 may include a receiver for the beacon transmitted by the beacon in primary receiver 190B. The beacon signal may indicate the SINR or other signal quality information at the primary receiver 190B. In some implementations, a control channel between the primary transmitter 190A and the primary receiver 190B may be received by a receiver in the secondary transmitter 192. The control channel may provide information from receiver 190B about the SINR or other signal quality information at the primary receiver 190B.

Rather than using a beacon or control channel, primary receiver 190B may instead send no information to secondary transmitter 192 about the signal quality at receiver 190B. When this is the case, secondary transmitter 192 may observe a response of the primary transmitter 190A to the interference caused by secondary transmitter 192 to primary receiver 190B. In order to observe at the secondary transmitter 192, the behavior of primary transmitter 190A, secondary transmitter 192 may require a receiver to at least partially receive the signal transmitted from primary transmitter 190A. In some implementations, partially receiving means that the receiver determines at least the current transmit power from primary transmitter 190A relative to previous determinations. If the signal quality falls below an acceptable level, primary receiver 190B may initiate a change to the signal transmitted from primary transmitter 190A that is observable by the secondary transmitter 192. In some implementations, in response to a received signal quality at 190B that is below an acceptable level, primary transmitter 190A may change the modulation of the transmitted signal to improve the signal quality at primary receiver 190B, and/or primary transmitter 190A may increase the transmit power. In some implementations, partially receiving means that the receiver determines the modulation of the signal transmitted from primary transmitter 190A.

In the example of FIG. 1, the primary user system 190A-B and the secondary user transmitter 192 do not have to cooperate by, for example, exchanging messages or agreeing to a handshake protocol in order to determine the null-space. If the PU is using a transmission scheme that adjusts the transmitted signal according to the SINR, the secondary transmitter 192 will be able to adjust the interference caused by secondary transmitter to primary receiver 190A to below a predetermined value without explicitly estimating an interference channel matrix, and without burdening the primary user with any handshake, estimation, and/or synchronization associated with secondary transmitter 192.

In the example of FIG. 1, the primary user system 190A-B may not be aware of the secondary transmitter 192. The features of the primary user system 190A-B that facilitate the null-space learning process of the secondary transmitter 192 may include a monotonic power control scheme where the transmitted power from primary transmitter 190A is caused to increase as interference increases. Other features that facilitate null-space learning include adjustments to modulation as a function of interference, and/or adjustments to data rate as a function of interference, and/or a single one-dimensional low rate beacon transmitted by the primary receiver 190B indicating the SINR at the primary receiver 190B. The use of a beacon may eliminate any needed cooperation to determine the null-space between the primary receiver 190B and the secondary transmitter 192.

Figure 2:
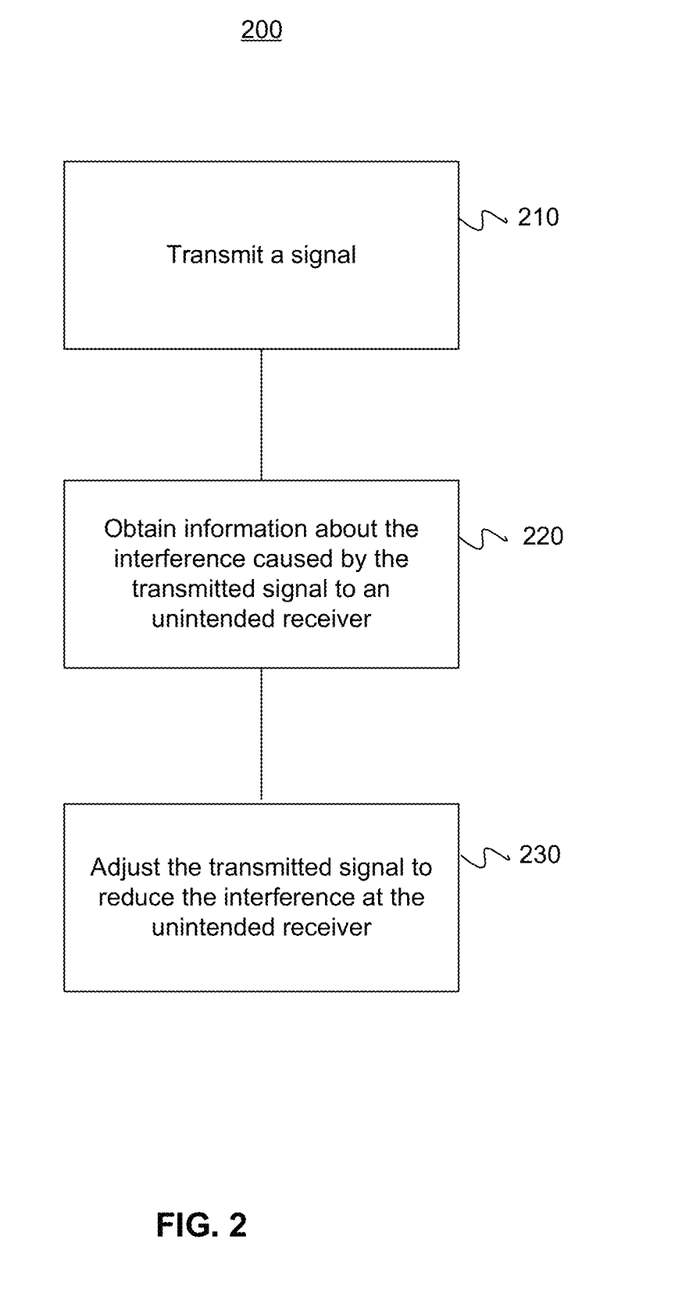
FIG. 2 depicts an example of a process for reducing the interference caused by a MIMO transmitter to an unintended MIMO receiver.

FIG. 2 depicts a process for reducing the interference to a receiver. The process of FIG. 2 may be implemented in a controller of a secondary transmitter such as a controller of secondary transmitter 192 in FIG. 1. In the example of FIG. 1, primary transmitter 190A transmits a MIMO signal, and primary receiver 190B is an intended receiver of the signal from transmitter 190A. At 210, secondary transmitter 192 also transmits a MIMO signal. At 220, the controller of secondary transmitter 192 may determine the interference caused to the primary receiver 190A by the transmissions of the secondary transmitter 192. At 230, secondary transmitter 192 may adjust the transmissions from secondary transmitter 192 to minimize the interference caused by secondary transmitter 192 to the primary receiver 190A.

At 210, a secondary transmitter such as the secondary transmitter 192 in FIG. 1 transmits a MIMO signal. The signal may be intended for (for example, directed to) a secondary receiver not shown in FIG. 1. The signal transmitted by secondary transmitter 192 may have an initial rotation matrix, such as an initial value of a MIMO precoding matrix, applied to the signal.

At 220, the secondary transmitter, such as secondary transmitter 192 in FIG. 1, obtains information about the interference caused by the signal transmitted from the secondary transmitter 192 to an unintended receiver such as the primary receiver 190B in FIG. 1. In some implementations, the information about the interference caused by the secondary transmitter 192 is received either directly from primary receiver 190B communicated over a beacon or a control channel, or indirectly from primary receiver 190B through an intermediary node, such as primary transmitter 190A or other node, to the secondary transmitter 192. Any other type of communication channel enabling the interference information to be sent from the primary receiver 190B to the secondary transmitter 192 may also be used. For example, the interference information may be sent through an intermediary node and a wired or wireless connection, or a combination of wired and wireless connections, and/or through the internet. In some implementations, the primary receiver 190B may send information related to the interference such as the signal to interference plus noise ratio (SINR) over a beacon or control channel. The information may be intended for the primary transmitter 190A but may be received by a receiver in a receiver in the secondary transmitter 192.

In some implementations, the secondary transmitter 192 may observe one or more features of the signal transmitted from the primary transmitter 190A to primary receiver 190B. In order to observe the features of the signal transmitted from the primary transmitter 190A, the controller at the secondary transmitter 192 may include a receiver. Observing the effect on primary transmitter 190A of the interference from secondary transmitter 192 is sometimes referred to as blind null-space learning as described further below and may be performed using, for example, a cyclic Jacobi method. The observed features of the signal transmitted from primary transmitter 190A may change in response to the interference caused by the secondary transmitter 192. The features of the signal transmitted from the primary transmitter 190A that the secondary transmitter 192 may observe include the transmit power, the modulation, the data rate, and others. The receiver and controller may determine that in response to increased interference from the secondary transmitter 192, the primary transmitter 190A has increased its transmit power, has adjusted the modulation require less transmit power to achieve a desired quality factor or bit-error-rate, or has lowered the data rate because a lower data rate requires less transmit power to achieve a desired quality factor or bit-error-rate.

At 230, the secondary transmitter such as secondary transmitter 192 in FIG. 1 adjusts the transmitted signal in response to the information about the interference caused by the transmitted signal (e.g. from secondary transmitter 92) to the unintended receiver (e.g. primary receiver 190B). The adjustment may correspond to a different rotation matrix applied to an initial MIMO precoding matrix, or a different MIMO precoding matrix. For example, the adjustment may be another rotation applied to an initial MIMO precoding matrix from a predetermined set of rotation matrices. In some implementations, a set with a number of predetermined rotation matrices or a number of predetermined precoding matrices may be individually applied as adjustments to the signal transmitted by secondary transmitter 192. In some implementations, the adjustment to the MIMO precoding matrix or rotation matrix applied at secondary transmitter 192 depends on the information about the interference obtained directly from the primary receiver (e.g. 190B) or from the observation of the signal transmitted from the primary transmitter (e.g. 190A).

Figure 3:
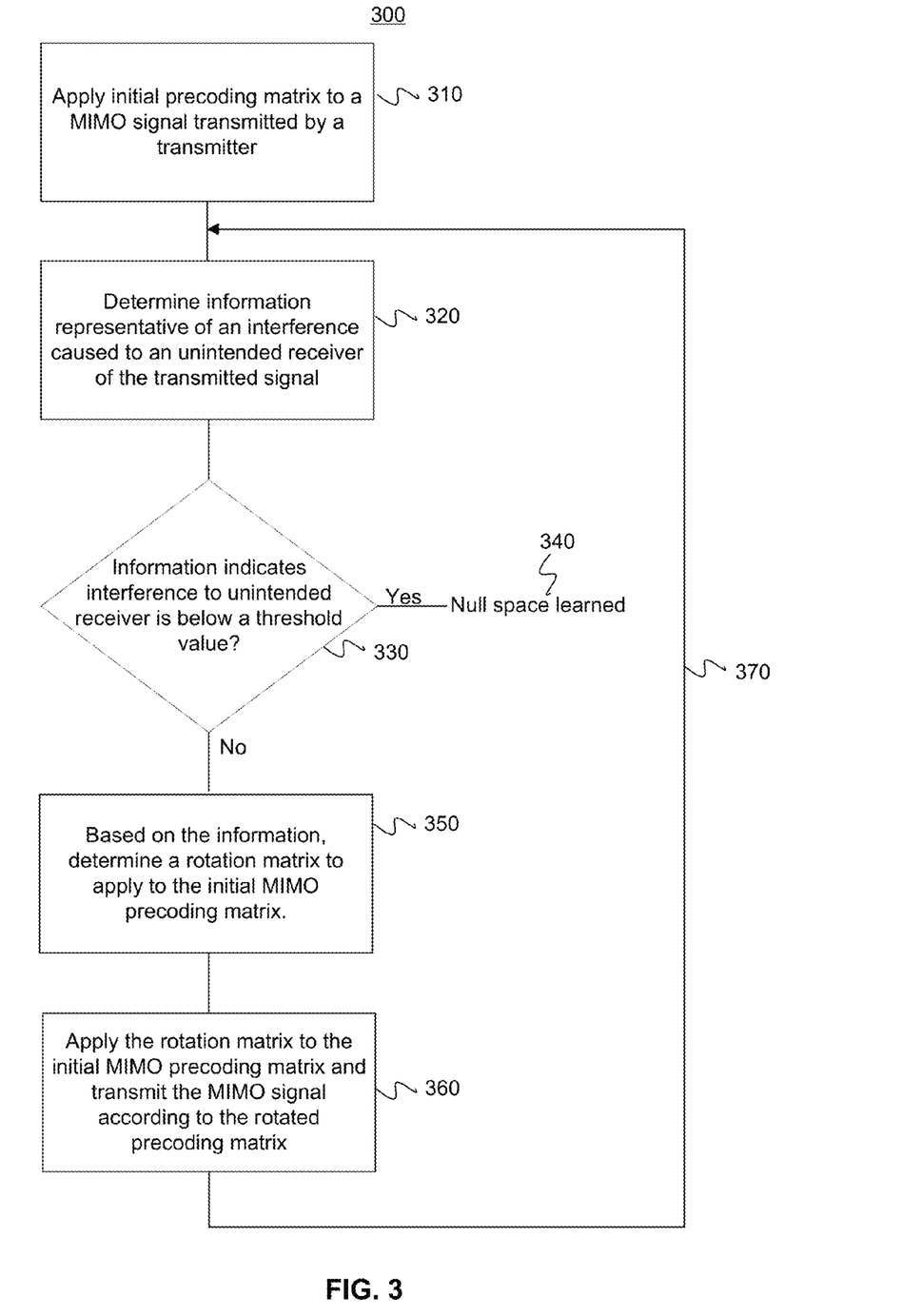
FIG. 3 depicts an example of a process for adjusting a MIMO precoding matrix to reduce the interference caused by a MIMO transmitter to an unintended MIMO receiver.

FIG. 3 depicts a process 300 for blind null-space learning between a secondary transmitter, such as the secondary transmitter 192 in FIG. 1, and a primary receiver, such as primary receiver 190B in FIG. 1. At 310, an initial precoding matrix is applied to a signal transmitted from a secondary transmitter 192. At 320, information is obtained by a controller included in secondary transmitter 192, the information representative of the interference caused by the secondary transmitter 192 to the primary receiver 190B. At 330, the controller in secondary transmitter 192 determines if the interference caused by the secondary transmitter 192 to the primary receiver 190B is below a threshold level corresponding to an acceptable level of interference. At 340, if the interference caused by secondary transmitter 192 to primary receiver 190B is below the threshold, then the null-space between the secondary transmitter 192 and primary receiver 190B is learned. If the interference caused by secondary transmitter 192 to primary receiver 190B is not below the threshold, at 350 a new rotation matrix based on the interference information is determined by the controller in secondary transmitter 192. At 360, the new rotation matrix is applied to the initial precoding matrix of the signal transmitted by secondary transmitter 192. The process returns to 320 where information representative of the interference is determined for the new rotation matrix applied to the initial MIMO precoding matrix. The process continues until a rotation matrix is determined by the controller in secondary transmitter 192 that causes interference to primary receiver 190B that is below the threshold value.

At 310, a secondary transmitter such as the secondary transmitter 192 in FIG. 1 transmits a signal. The signal from the secondary transmitter 192 may interfere at a primary receiver such as primary receiver 190B in FIG. 1 with a signal from a primary transmitter such as primary transmitter 190A in FIG. 1. At 310, an initial MIMO precoding or rotation matrix is applied to the signal transmitted from secondary transmitter 192.

At 320, information representative of the interference caused by the secondary transmitter 192 to the primary receiver 190B is determined at the controller in the secondary transmitter 192. In some implementations, the information about the interference caused by the secondary transmitter 192 is received at the controller either directly from primary receiver 190B communicated over a beacon or control channel, or received from primary receiver 190B through an intermediary node, such as primary transmitter 190A or other node. Any other type of communication channel enabling the interference information to be sent from the primary receiver 190B to the secondary transmitter 192 may also be used. For example, the interference information may be sent through an intermediary node and a wired or wireless connection, or a combination of wired and wireless connections, and/or through the internet. In some implementations, the primary receiver 190B may send information related to the interference such as SINR over a beacon or control channel. A receiver in the secondary transmitter 192 may receive the beacon signal or control channel signal sent from the primary receiver 190B to the primary transmitter 190A. The SINR information may be intended for the primary transmitter 190A but may be received by the receiver in the secondary transmitter 192.

In some implementations, the secondary transmitter 192 may observe one or more features of the signal transmitted from the primary transmitter 190A to primary receiver 190B. In order to observe the features of the signal transmitted from the primary transmitter 190A, the controller at the secondary transmitter 192 may include a receiver. Observing the effect on primary transmitter 190A of the interference from secondary transmitter 192 and learning the null-space of primary transmitter 190A is sometimes referred to herein as blind null-space learning as further described below. Blind null-space learning may be performed based on a cyclic Jacobi method. In the case of channel reciprocity (for example, if the PU uses time-division multiple access), other techniques, such as estimating the null-space based on second order statistics may be used. The observed features of the signal transmitted from primary transmitter 190A may change in response to the interference caused by the secondary transmitter 192. The features of the signal transmitted from the primary transmitter 190A that the secondary transmitter 192 may observe include the transmit power, the modulation, the data rate, and others. The receiver and controller in secondary transmitter 192 may determine that in response to increased interference from the secondary transmitter 192, the primary transmitter 190A has increased its transmit power, or has adjusted the modulation to a different modulation requiring less transmit power to achieve a desired quality factor or bit-error-rate, or has lowered the data rate because a lower data rate requires less transmit power to achieve a desired quality factor or bit-error-rate.

At 330, the controller in secondary transmitter 192 determines if the interference caused by the secondary transmitter 192 to the primary receiver 190B is below a threshold level. For example, the controller in secondary transmitter 192 may receive information about the interference by receiving a signal from a low rate control channel or beacon transmitted by primary receiver 190B. In some implementations, a receiver in the controller in secondary transmitter 192 observes features of the signal transmitted from primary transmitter 190A. The observed features may include one or more of a change in primary transmitter 190A transmit power, modulation, data rate, or other feature. Based on the information about the interference caused by secondary transmitter 192 to primary receiver 190B, the controller in secondary transmitter 192 determines if the interference is below a threshold value.

At 340, if the interference caused by secondary transmitter 192 to primary receiver 190B is below the threshold, then the null-space between the secondary transmitter 192 and primary receiver 190B is learned. With the null-space learned, secondary transmitter 192 can transmit without causing unacceptable interference to primary receiver 190B. As such, the time and frequency used by primary receiver 190B may also be used by secondary transmitter 192 resulting in more efficient utilization of time and frequency resources.

At 350, the interference caused by secondary transmitter 192 to primary receiver 190B is not below the threshold, a new rotation matrix based on the interference information is determined by the controller in secondary transmitter 192. Information about the previous rotation matrix and the resulting interference may also be used in determining a new rotation matrix. For example, if a change from the previous rotation matrix to the current rotation matrix may be represented by a rotation in a particular direction, and the interference resulting from the current rotation matrix compared to the previous rotation matrix is less, then the controller may in the next iteration rotate the MIMO precoding matrix in the same direction. A rotation in the same direction may result in less interference. Rotating the MIMO precoding matrix may include applying a rotation matrix to the initial MIMO precoding matrix.

At 360, the new rotation matrix is applied to the initial precoding matrix of the signal transmitted by secondary transmitter 192. The process returns to 320 where information representative of the interference is determined for the new rotation matrix applied to the initial MIMO precoding matrix. The process continues (i.e., repeats the process between 320 and 360) until a rotation matrix is determined by the controller in secondary transmitter 192 that causes interference to primary receiver 190B that is below the threshold value.

Figure 4:
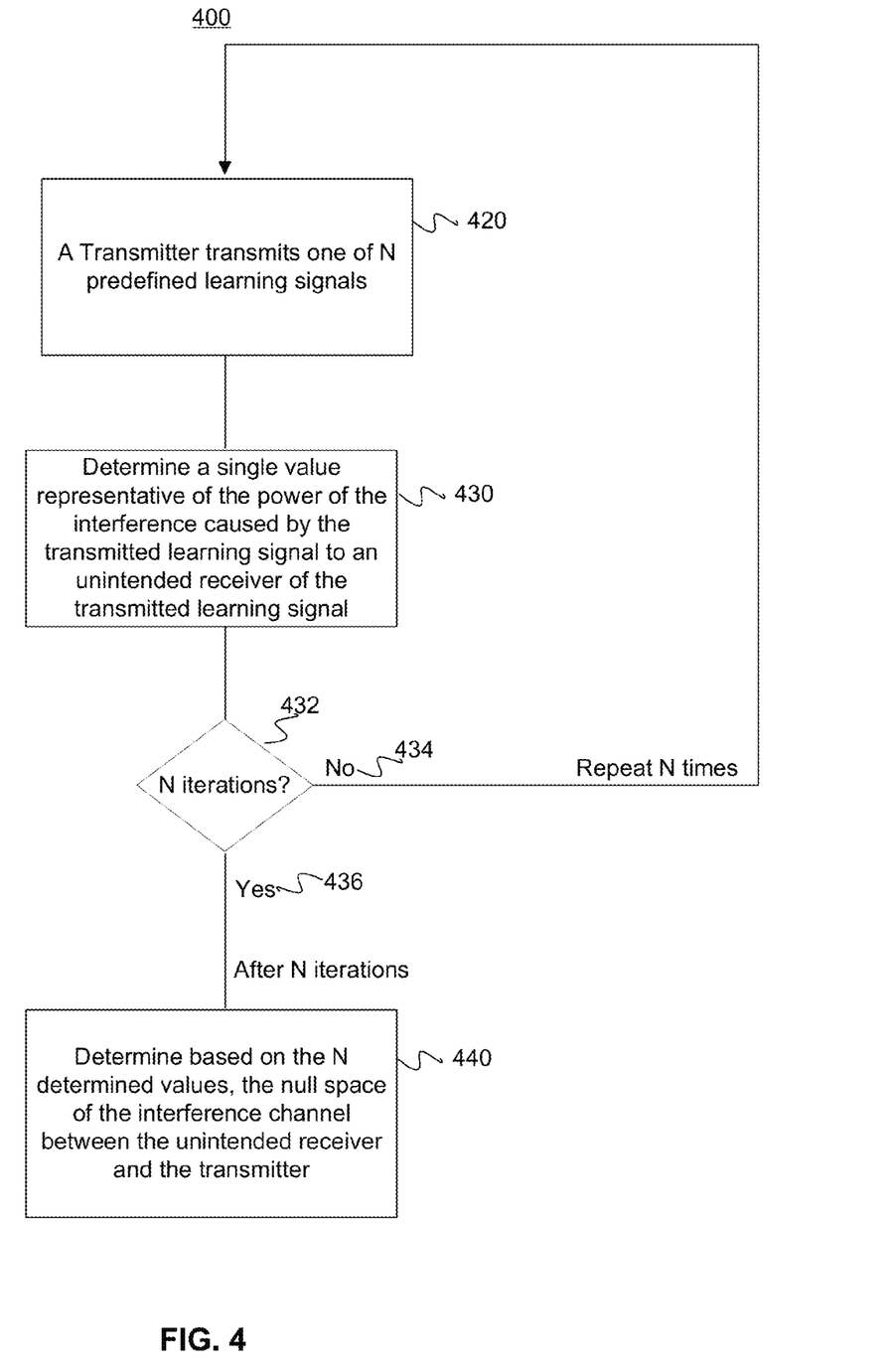
FIG. 4 depicts another example of a process for determining a null-space between a MIMO transmitter and a MIMO receiver.

FIG. 4 depicts a process for determining the null-space between a primary receiver such as receiver 190B in FIG. 1 and a secondary transmitter such as secondary transmitter 192 in FIG. 1. In the example of FIG. 1, primary transmitter 190A transmits a MIMO signal and primary receiver 190B is an intended receiver of the signal from primary transmitter 190A. At 420, secondary transmitter 192 transmits a MIMO signal comprising one of N predefined learning signals. Secondary transmitter 192 may include a controller that determines the interference caused to the primary receiver 190B by the transmissions of the secondary transmitter 192. At 430, the controller may determine a single value representative of the power of the interference caused to the primary receiver 190B by each of the predefined learning signals transmitted from the secondary transmitter 192. If the current predefined learning signal is not the Nth of the N predetermined learning signals, then at 432 the process 420, 430 is repeated for the next predefined learning signal. If the last transmitted learning signal is the Nth learning signal, then at 434, the process proceeds to determining the null-space of the interference channel. At 440, the null-space between the primary receiver 190B and the secondary transmitter 192 is determined based on the N determined single values representative of the interference power caused by secondary transmitter 192 to the primary receiver 190B.

At 420, a secondary transmitter such as the secondary transmitter 192 in FIG. 1 transmits a MIMO signal comprising one of N predefined learning signals. Each learning signal may include a different rotation matrix applied to an initial MIMO precoding matrix. The signal from secondary transmitter 192 may be intended for a secondary receiver not shown in FIG. 1. The signal transmitted by the secondary transmitter 192 may include an initial MIMO precoding matrix or an initial rotation matrix applied to the initial MIMO precoding matrix. The (N-1) other predefined learning signals may include different rotation matrices applied to the initial MIMO precoding matrix.

At 430, the secondary transmitter such as secondary transmitter 192 in FIG. 1 determines a single value representative of the power of the interference caused to the primary receiver 190B by one of the N learning signals transmitted by secondary transmitter 192. In some implementations, a single value representative of the power of the interference caused by the secondary transmitter 192 is received either directly from primary receiver 190B by communicating over a beacon channel, or indirectly from primary receiver 190B through an intermediary node, such as primary transmitter 190A or other node. Any other type of communication channel enabling the single value representative of the power of the interference to be sent from the primary receiver 190B to the secondary transmitter 192 may also be used. For example, the single value representative of the power of the interference may be sent through an intermediary node and a wired or wireless connection, or a combination of wired and wireless connections, and/or through the internet. In some implementations, the primary receiver 190B may send a single value representative of the power of the interference such as the signal to interference plus noise ratio (SINR) over a beacon or control channel. The single value representative of the power of the interference may be intended for the primary transmitter 190A but may be received by a receiver in secondary transmitter 192.

In some implementations, the secondary transmitter 192 may observe one or more features of the signal transmitted from the primary transmitter 190A to primary receiver 190B. In order to observe the features of the signal transmitted from the primary transmitter 190A, the controller at the secondary transmitter 192 may include a receiver. Observing the effect on primary transmitter 190A of the interference from secondary transmitter 192 is sometimes referred to as blind null-space learning as further described below and may be performed using a cyclic Jacobi method. The observed features of the signal transmitted from primary transmitter 190A may change in response to the interference caused by the secondary transmitter 192. For example, the receiver and controller in secondary transmitter 192 may observe the transmit power from primary transmitter 190A. From the observed transmit power of primary transmitter 190A, the secondary transmitter may determine a single value representative of the interference caused by the secondary transmitter 192 to the primary receiver 190B. The receiver may determine that in response to increased interference from the secondary transmitter 192, the primary transmitter 190A has increased its transmit power.

At 432, the secondary transmitter such as secondary transmitter 192 in FIG. 1 determines if all N predefined learning signals have been transmitted (one at a time) by secondary transmitter 192 and the N associated single values representative of the interference have been determined. If all N predefined learning signals have not been transmitted by secondary transmitter 192, at 434 the process returns to 420 where the next of the N predefined learning signals is transmitted. If all N predefined learning signals have been transmitted, at 436 the process continues to determine the null-space at 440.

At 440, the secondary transmitter 192 determines the null-space of the interference channel between the primary receiver 190B and the secondary transmitter 192 based on the determined N single values representative of the interference power caused by the N predefined learning signals transmitted by the secondary transmitter 192 to the primary receiver 190B. Once the null-space is determined, secondary transmitter 192 may transmit at the same time and using the same spectrum as primary transmitter 190A without causing interference to primary receiver 190B above a predetermined value.

In some implementations, the interference channel (and related null-space) between a secondary transmitter such as secondary transmitter 192 in FIG. 1 and a primary receiver such as primary receiver 190B in FIG.1 changes over time. Changes to the null-space may be due to movement of the primary receiver 190B, primary transmitter 190A, or secondary transmitter 192. Changes to the null-space may also be due to changes in the atmosphere or environment between primary transmitter 190A, primary receiver 190B, and secondary transmitter 192. Changes to the atmosphere may include temperature variations, humidity variations, and other atmospheric variations. Changes to the environment may include movement of transmitter 190A, movement of primary receiver 190B, or movement of secondary transmitter 192, and/or movement of other objects near primary transmitter 190A, primary receiver 190B, and/or secondary transmitter 192. As the null-space changes, the interference caused to the primary receiver 190B by the secondary transmitter 192 changes. The interference due to the rotation applied to the MIMO precoding matrix changes with the interference channel. Thus, the rotation to the MIMO precoding matrix must track the changing null-space in order to not increase the interference from secondary transmitter 192 to the primary receiver 190B. In some implementations, the time-varying null-space is tracked continuously. The process of tracking the null-space is sometimes referred to as blind null-space tracking.

Blind null-space learning (or passive null-space learning) may be performed using a modified version of a cyclic Jacobi method. In the case of channel reciprocity, other techniques may be used as well. In some implementation of the instant subject matter, the null-space of an interference channel between a secondary transmitter and a primary receiver may be found that meets an arbitrarily small interference constraint. In some implementations, the null-space may be found without explicitly estimating an interference channel matrix, H (and without observing the Hermitian matrix G=H*H), between the secondary transmitter and primary receiver.

The null-space may be found without burdening the primary receiver with any handshaking, estimation, or synchronization associated with the secondary transmitter. In some implementations, the primary receiver may not cooperate with the secondary transmitter, where the primary transmitter and primary receiver operate as if they are the only users of the channel (transmission medium such as air, space, and the like). No handshake or synchronization between the primary transmitter and the secondary transmitter may be needed.

In some implementations, a condition required of the primary transmitter is that for some short time interval (that may be much shorter than the entire learning process), the primary transmitter uses a power control scheme such that its transmitted power is a monotonic function of the interference caused by the secondary transmitter. In this case, the learning signals disclosed herein gradually reduce the interference caused by the secondary transmitter to the primary receiver by iteratively modifying the spatial orientation of the signal transmitted by the secondary transmitter. For example, with each iteration, the secondary transmitter may determine the effect of each modification to the secondary transmitter's signal on the primary transmitter's total transmit power. In this way, the learning process may be based on energy measurements (at the secondary transmitter of the signal from the primary transmitter) or indications of energy variations.

The blind null-space may be determined by finding the eigenvectors in the eigenvalue decomposition of the unobserved matrix G that cause the least interference to secondary transmitter 192. To blindly determine the null-space, eigenvectors that span the null-space of the unobserved matrix G may be obtained using a blind approach for realizing a cyclic Jacobi technique. These eigenvectors that span the null-space may cause a minimum interference.

During a learning process, the secondary transmitter may vary the interference to the primary receiver by transmitting different interfering signals. With each of the K different interfering (learning) signals, the secondary transmitter determines whether the primary transmitter's transmitted energy has increased or decreased compared to the previous learning signal. The learning process is carried out as follows: In the first cycle, (n=1), the secondary transmitter transmits a signal x(1), such that the interference constraint is satisfied, and determines whether the primary transmitter's transmit energy, q(1), has increased or decreased compared to the energy transmitted in response to the previous signal x(0) (Note: at n=0, the SU does not transmit). At the next cycle (n=2), the secondary transmitter transmits another signal x(2) and determines whether the primary transmitter's transmit energy, q(2), has increased or decreased compared to the energy transmitted in response to the previous signal x(1), and so on. Based on q(1), q(2) . . . q(K), the null-space of the interference channel matrix H can be determined using, for example, the blind approach for realizing the cyclic Jacobi technique disclosed herein.

The Jacobi technique may obtain the eigenvalue decomposition of the Hermitian matrix G via a series of 2-dimensional rotations that eliminate two off-diagonal elements at each phase. It may begin with setting $A_0$=G and then performing rotation operations according to $A_{k+1}=V_k A_k V^*_k$ where $V_k$=R ($\theta$, $\phi$) is the $k^{th}$ unitary rotation matrix.

Instead of using a two-dimensional optimization, the Jacobi technique may be carried out, without observing the matrix G, using line searches to perform two one-dimensional optimizations.

The null-space of the interference channel H can be determined based on two one-dimensional optimizations over $\theta$ and $\phi$ to determine a rotation matrix $R(\theta, \phi)$ that leads to an eigenvalue decomposition of G (which enables determining the null-space of H). Each step in the optimization may correspond to a learning stage and a new rotation matrix applied to the pre-coding matrix.

Figure 5A:
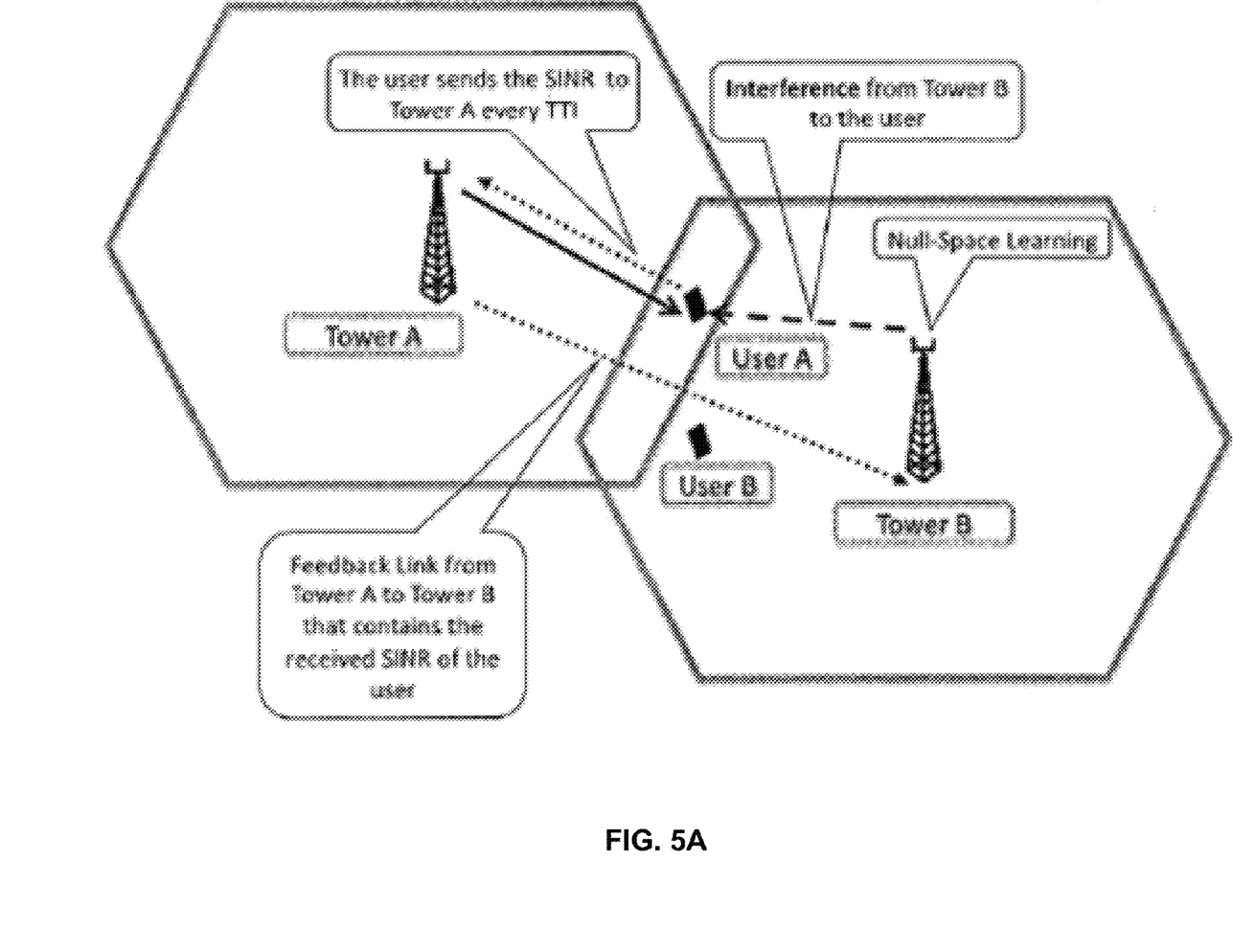
FIG. 5A depicts an example demonstrating interference mitigation between two adjacent and overlapping cells in a cellular or wireless system.
Figure 5B:
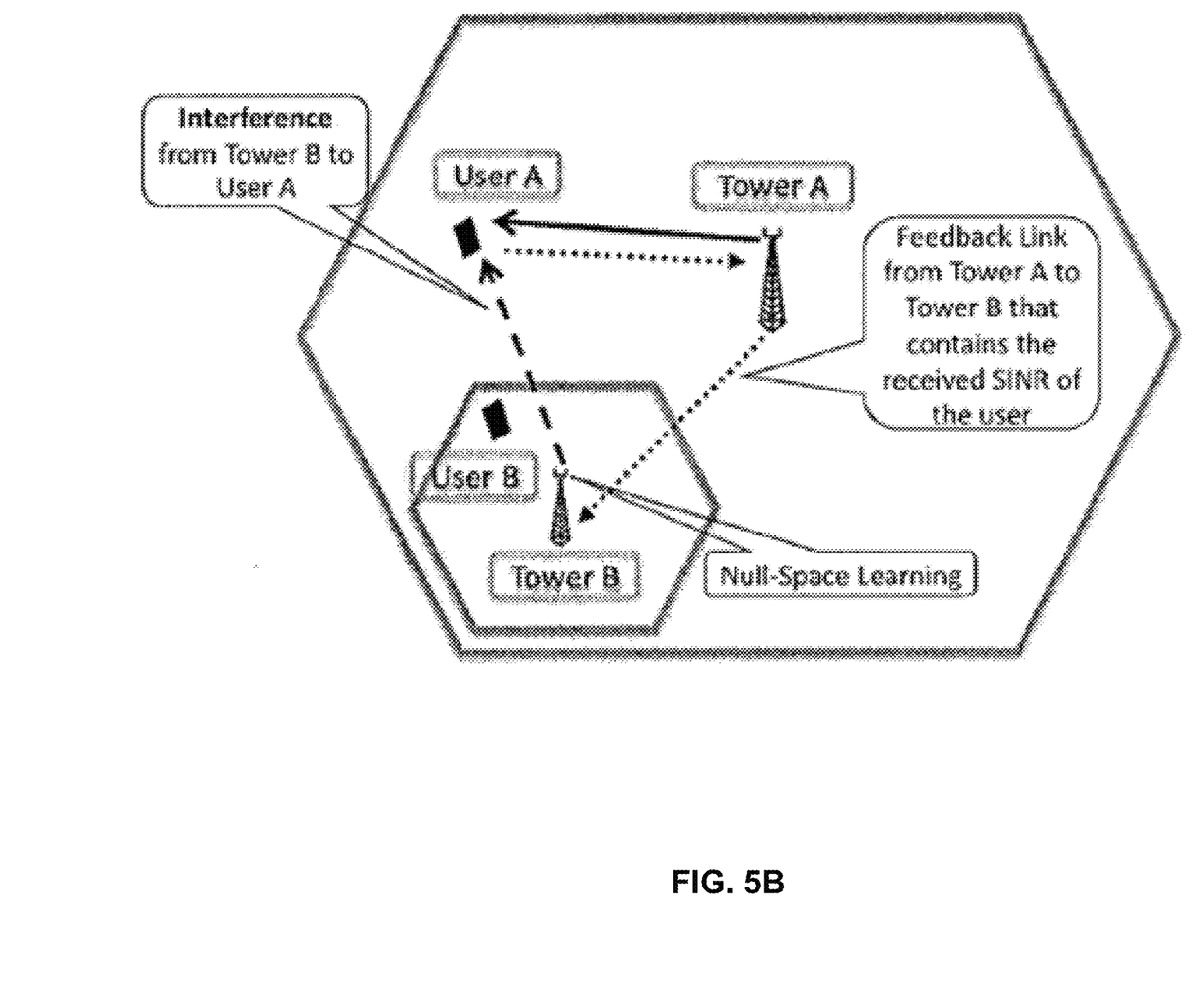
FIG. 5B depicts another example demonstrating interference mitigation between two adjacent and overlapping cells in a cellular or wireless system.
Figure 5C:
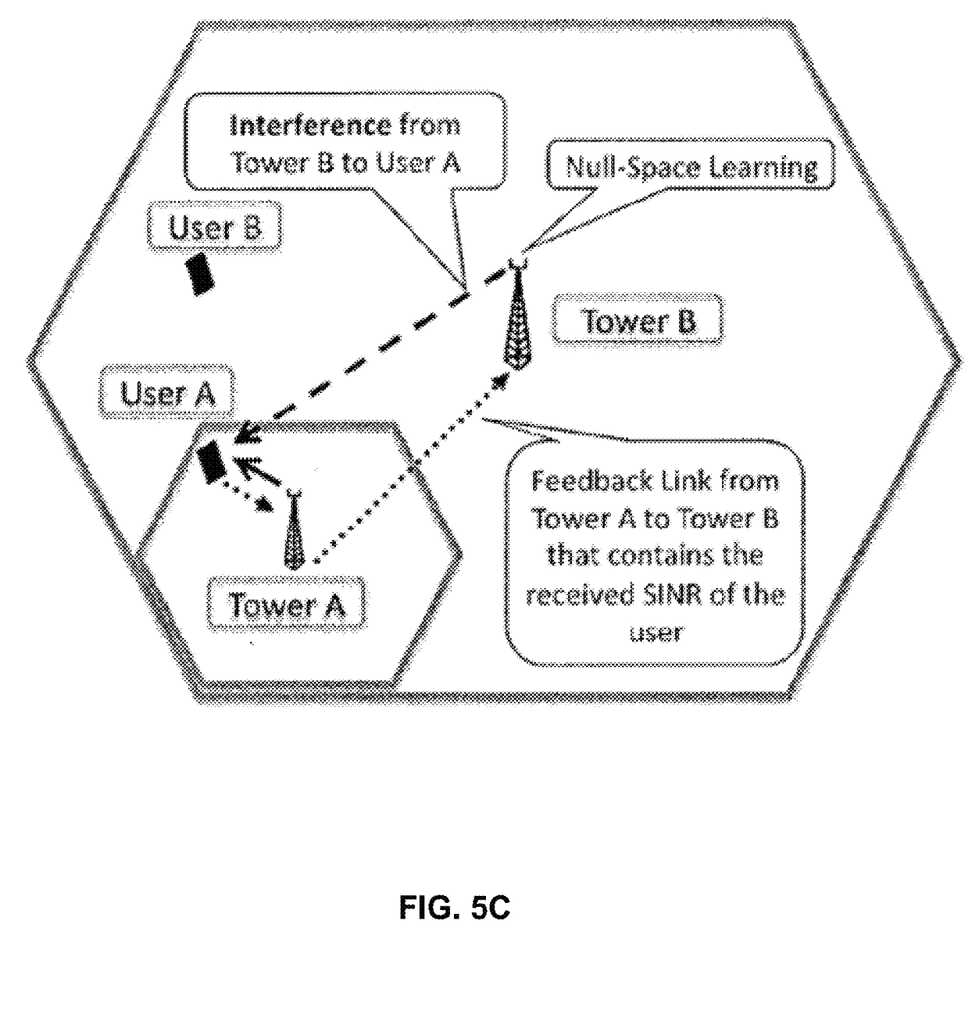
FIG. 5C depicts another example demonstrating interference mitigation between two adjacent and overlapping cells in a cellular or wireless system.

FIGS. 5A-C depict examples of applications of the processes shown in FIGS. 1-4 for null-space learning. In FIGS. 5A-C, example systems demonstrating interference mitigation between two cells of a cellular or wireless system are shown. The cellular system includes cellular communications towers such as Towers A and B that are fixed in location and serve a predefined geographic area. The cellular system also includes mobile terminals, user equipment, and the like, such as Users A and B.

FIG. 5A depicts an example system demonstrating interference mitigation between two adjacent and overlapping cells in a cellular or wireless system.

FIG. 5B depicts an example system demonstrating interference mitigation performed at a lower layer cell by Tower B (cell covering smaller geographic area) that is geographically contained in a higher layer cell with Tower A (cell covering a larger geographic area).

FIG. 5C depicts an example system demonstrating interference mitigation performed at a higher layer cell by Tower B (cell covering larger geographic area) that geographically contains a lower layer cell with Tower A (cell covering a smaller geographic area).

In FIGS. 5A-C, Tower B performs null-space learning of the interference channel between User A and Tower B.

In the examples of FIGS. 5A-C, Tower A and User A correspond to the primary transmitter 190A and primary receiver 190B described in FIGS. 1-4. Tower B corresponds to the secondary transmitter 192 in FIGS. 1-4. Tower B may receive information directly from Tower A about the interference caused by Tower B to User A. This is sometimes referred to as active null-space learning. Although not shown in FIG. 5A, Tower B may also observe one or more features of the signal transmitted from Tower A to User A in response to the interference from Tower B as described above in FIGS. 2-4. Observing features of the signal transmitted from Tower A is sometimes referred to as passive null-space learning. In this example, null-space learning provides interference mitigation.

In the example of FIGS. 5A-C, User A is located near the boundary between areas covered by cell Towers A and B where Tower B interferes at User A with the intended signal from Tower A. In the examples of FIG. 5A-C, Tower A has assigned to User A the downlink frequency F1. Tower A has a communication path to Tower B that may be wired, wireless or a combination thereof and may pass through the internet. Without interference mitigation, Tower B is constrained to transmit at low power or no power when using downlink frequency F1 in order to not unacceptably interfere with User A's reception of the signal from Tower A.

Active or passive null-space learning as disclosed herein can be utilized at Tower B to provide interference mitigation between the signal transmitted by Tower B and the signal received at User A from Tower B. Active null-space learning includes null-space learning where information about the interference caused by a secondary transmitter such from Tower B is determined at a primary receiver such as User A and sent from User A directly or indirectly to Tower B via a communication link. The sending may also be done via a beacon which is broadcasted by Tower A. Passive null-space learning includes null-space learning where the behavior of Tower A is observed in order to determine the effect of interference from Tower B. An example of passive null-space learning is blind null-space learning. As a result of the interference mitigation provided by null-space learning, downlink frequency F1 may be used by Tower B to communicate to User B, without Tower B generating intolerable interference to User A.

In some implementations consistent with FIG. 5A, Tower B may decode the control channel of User A in order to determine the signal to interference plus noise ratio (SINR) at User A. In some implementations, when User A is fixed or moving slowly, the interference channel between Tower B and User A changes slowly making the tracking of the interference channel (null-space) easier. In some implementations, when at least one bit of interference information can be sent to Tower B, blind null-space learning and tracking may be used. In some implementations, active null-space learning has a faster learning time than the blind null-space learning and blind null-space tracking.

Figure 6:
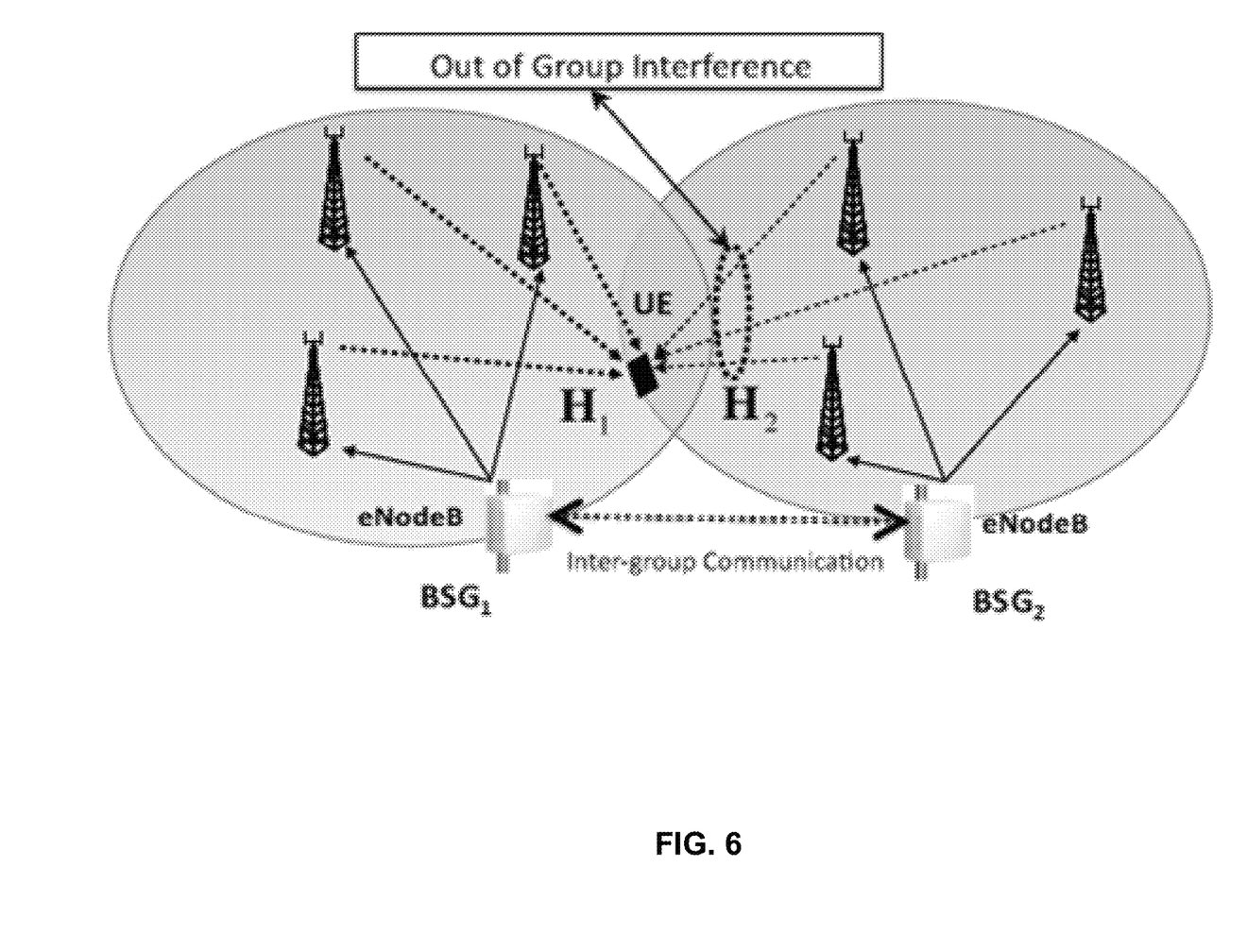
FIG. 6 depicts an example demonstrating interference mitigation between a user equipment and a group of base stations.

FIG. 6 depicts an example system demonstrating interference mitigation between a primary user such as User A in FIGS. 5A-C and a group of base stations or wireless access points. In the example of FIG. 6, neighboring base stations may coordinate their transmissions to more effectively utilize the available spectrum. The coordination of the group of base stations is sometimes referred to as cooperative multi-point technology. However, the benefits of the coordination of base stations may be limited by interference caused by base stations outside the coordinated group.

For example, the user equipment (UE) in FIG. 6 may be connected to the base station(s) in base station group 1 ($BSG_1$). The base station(s) in base station group 1 may be coordinated to efficiently utilize spectrum and to minimize interference between the base station(s) of base station group 1. However, the base station(s) in base station group 2 ($BSG_2$) may not be coordinated with the transmissions from base station group 1. As a result, the transmissions from base station group 2 may interfere at the user equipment with reception of the intended signal from one of the base station (s) in base station group 1.

The interference caused by the base station(s) in base station group 2 to the user equipment of base station group 1 can be minimized at the base stations in base station group 2 by employing the null-space learning and tracking described in FIGS. 1-4. Active or passive null-space learning can be performed at the base stations of base station group 2 by determining the interference caused by the base stations in base station group 2 to the user equipment (UE) associated with base station group 1. The interfering base station group 2 may transmit a sequence of learning signals which may cause interference to the user equipment. In this example, the user equipment determines the interference and sends the interference information to the base station(s) of base station group 1. Base station group 1 may distribute the interference information to the base stations of base station group 2 (the interfering base station group). Base station group 2 then learns the null-space of the interference channel between the user equipment associated with base station group 1 and the interfering base station(s) of base station group 2.

Performing null-space learning at base station group 2 may not affect the transmission protocol between the user equipment and the base stations of base station group 1, and may not change the signaling of the control channel. The user equipment may communicate with base station group 1 and may treat the learning signals from base station group 2 as interference.

Figure 7:
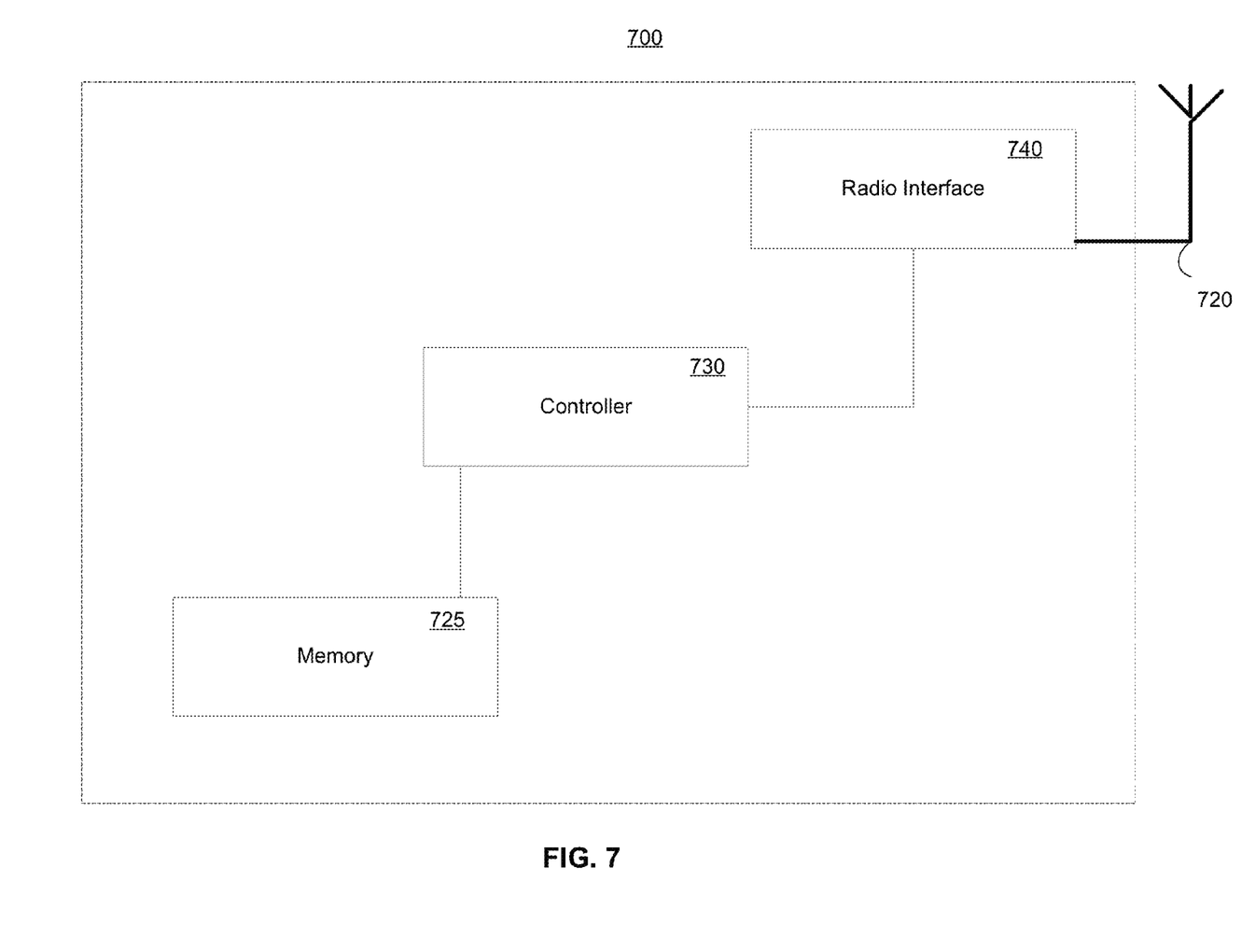
FIG. 7 depicts an example of a radio, such as a user equipment, base station, or access point, in accordance with some exemplary embodiments.

FIG. 7 depicts an example implementation of a radio 700, such as a base station, an access point and/or a user equipment. The radio 700 may include MIMO antennas 720 configured to transmit via one or more downlinks and to receive one or more uplinks via the antennas 720. The radio may further include a radio interface 740 coupled to the antenna 720, and a controller 730 for controlling the base station 700 and for accessing and executing program code stored in memory 735. The radio interface 740 may further include other components, such as filters, oscillators, mixers, other radio frequency components, as well as converters (e.g., digital-to-analog converters and the like), one or more processors, signal shaping components, and the like, to generate symbols for a transmission via the one or more downlinks and to receive symbols via the one or more uplinks. In some implementations, the radio may also be compatible with WiFi, WiMAX, Bluetooth, GERAN, UTRAN, and E-UTRAN, and/or other standards and specifications as well. The radio may be configured to perform one or more aspects of the subject matter described herein.

The radio 700 may be implemented as a mobile device and/or a stationary device. For example, radio 700 may be referred to as, for example, a user equipment, a mobile station, a mobile unit, a subscriber station, a wireless terminal, a tablet, a smart phone, a laptop, a computer, or the like. For example, the radio 700 may be implemented as, for example, a wireless handheld device, and/or a wireless plug-in accessory which inserts into another device (e.g., a computer, a tablet, or the like).

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
   transmitting, by a secondary transmitter, a first learning signal, wherein the first learning signal causes an interference to a primary transmitter communicating with a primary receiver;
   receiving, at the secondary transmitter, a first characteristic value of the primary transmitter representative of the interference;
   generating, based on the first characteristic value, a second learning signal, wherein the generated second learning signal causes less interference to the primary transmitter communicating with the primary receiver, and wherein the less interference is indicated by a received second characteristic value;
   determining, based on at least the received first characteristic value and the received second characteristic value, a null-space for a channel between the secondary transmitter and the primary receiver; and
   transmitting, by the secondary transmitter, a signal in accordance with the determined null-space.

2. The method of claim 1, wherein the null-space is determined by generating at least one additional learning signal, transmitting the at least one additional learning signal, and receiving at least one additional characteristic value.

3. The method of claim 1, wherein the null-space represents a configuration of the secondary transmitter that causes the interference at the primary receiver to be below a threshold interference value.

4. The method of claim 1, wherein
   the generating the the first learning signal and the second learning signal is performed by at least applying rotation matrices to an initial multiple-input multiple-output precoding matrix.

5. The method of claim 4, wherein the rotation matrices are determined by performing a cyclic Jacobi.

6. The method of claim 1, wherein the transmitting the signal in accordance with the determined null-space mitigates the interference to the primary receiver.

7. The method of claim 1, wherein one or more of the first characteristic value and the second characteristic value is received from the primary transmitter via at least one of a beacon or a control channel.

8. The method of claim 1, wherein the first characteristic value and the second characteristic value represent a signal-to-noise plus interference ratio value.

9. The method of claim 1, wherein the determining the null-space of the interference channel between the secondary transmitter and the primary receiver does not depend on the modulation or coding of a signal transmitted by the primary transmitter or the modulation or coding of the first or second learning signals transmitted by the secondary transmitter.

10. The method of claim 1, wherein the receiving the first characteristic value representative of the interference includes an observation of a response from the primary transmitter to the first learning signal.

11. The method of claim 1, wherein the primary receiver comprises an unintended receiver.

12. An apparatus comprising system comprising:
    at least one processor; and at least one memory including computer program code, which when executed provides at least the following:
    transmitting, by a secondary transmitter, a first learning signal, wherein the first learning signal causes an interference to a primary transmitter communicating with a primary receiver;
    receiving, at the secondary transmitter, a first characteristic value of the primary transmitter representative of the interference;
    generating a second learning signal based on the first characteristic value, wherein the generated second learning signal causes less interference to the primary transmitter communicating with the primary receiver, and wherein the less interference is indicated by a received second characteristic value;
    determining, based on at least the received first characteristic value and the received second characteristic value, a null-space for a channel between the secondary transmitter and the primary receiver; and
    transmitting, by the secondary transmitter, a signal in accordance with the determined null-space.

13. The apparatus of claim 12, wherein the null-space is determined by generating at least one additional learning signal, transmitting the at least one additional learning signal, and receiving at least one additional characteristic value.

14. The apparatus of claim 12, wherein the null-space represents a configuration of the secondary transmitter that causes the interference at the primary receiver to be below a threshold interference value.

15. The apparatus of claim 12, wherein the generating the first learning signal and the second learning signal is performed by at least applying rotation matrices to an initial multiple-input multiple-output precoding matrix.

16. The apparatus of claim 15, wherein the rotation matrices are determined by performing a cyclic Jacobi.

17. The apparatus of claim 12, wherein the transmitting the signal in accordance with the determined null-space mitigates the interference to the primary receiver.

18. The apparatus of claim 12, wherein one or more of the first characteristic value and the second characteristic value is received from the primary transmitter via at least one of a beacon or a control channel.

19. The apparatus of claim 12, wherein the first characteristic value represents a signal-to-noise plus interference ratio values.

20. The apparatus of claim 12, wherein the determining the null-space of the interference channel between the secondary transmitter and the primary receiver does not depend on the modulation or coding of a signal transmitted by the primary transmitter or the modulation or coding of the first or second learning signals transmitted by the secondary transmitter.

21. The apparatus of claim 12, wherein the receiving the first characteristic value representative of the interference includes an observation of a response from the primary transmitter to the first learning signal.

22. A non-transitory computer-readable medium encoded with instructions that, when executed by at least one processor, perform operations comprising:
   transmit, by a secondary transmitter, a first learning signal, wherein the first learning signal causes an interference to a primary transmitter communicating with a primary receiver;
   receive, at the secondary transmitter, a first characteristic value of the primary transmitter representative of the interference;
   generate a second learning signal based on the first characteristic value, wherein the generated second learning signal causes less interference to the primary transmitter communicating with the primary receiver, and wherein the less interference is indicated by a received second characteristic value;
   determine, based on at least the received first characteristic value and the received second characteristic value, a null-space for a channel between the secondary transmitter and the primary receiver; and
   transmit, by the secondary transmitter, a signal in accordance with the determined null-space.

23. An apparatus comprising:
   a secondary transmitter configured to transmit, a first learning signal, wherein the first learning signal causes an interference to a primary transmitter communicating with a primary receiver;
   a secondary receiver, at the secondary transmitter, configured to receive a first characteristic value of the primary transmitter representative of the interference; and
   a processor configured to at least generate a second learning signal based on the first characteristic value, wherein the generated second learning signal causes less interference to the primary transmitter communicating with the primary receiver, wherein the less interference is indicated by a received second characteristic value, and further configured to at least determine, based on at least the received first characteristic value and the received second characteristic value, a null-space for a channel between the secondary transmitter and the primary receiver, and wherein the secondary transmitter is further configured to transmit a signal in accordance with the determined null-space.

* * * * *